US008963512B2

(12) United States Patent
Takano

(10) Patent No.: US 8,963,512 B2
(45) Date of Patent: Feb. 24, 2015

(54) POWER SUPPLY DEVICE AND ELECTRIC POWER CONVERSION DEVICE USING THE SAME

(71) Applicant: Sanyo Electric Co., Ltd., Osaka (JP)

(72) Inventor: Yoh Takano, Takatsuki (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 62 days.

(21) Appl. No.: 13/770,821

(22) Filed: Feb. 19, 2013

(65) Prior Publication Data

US 2013/0155741 A1   Jun. 20, 2013

Related U.S. Application Data

(63) Continuation of application No. PCT/JP2011/004772, filed on Aug. 26, 2011.

(30) Foreign Application Priority Data

Aug. 27, 2010  (JP) ................................. 2010-191200

(51) Int. Cl.
| | | |
|---|---|---|
| *G05F 1/00* | (2006.01) | |
| *H02M 5/42* | (2006.01) | |
| *H02M 7/68* | (2006.01) | |
| *H02M 3/24* | (2006.01) | |
| *H02M 7/44* | (2006.01) | |
| *H02M 7/5387* | (2007.01) | |
| *H02M 3/156* | (2006.01) | |
| *H02M 7/483* | (2007.01) | |

(52) U.S. Cl.
CPC ............ *H02M 7/5387* (2013.01); *H02M 3/156* (2013.01); *H02M 7/483* (2013.01)
USPC ............................................ 323/222; 363/98

(58) Field of Classification Search
USPC .......................................... 323/222, 266, 272
See application file for complete search history.

(56) References Cited

U.S. PATENT DOCUMENTS

| 6,813,318 B1 * | 11/2004 | Westfield et al. ............. 375/295 |
| 2007/0096711 A1 * | 5/2007 | Ishii et al. ..................... 323/288 |

FOREIGN PATENT DOCUMENTS

| JP | 02-032392 | 2/1990 |
| JP | 08-191569 | 7/1996 |
| JP | 2004-336152 A | 11/2004 |

OTHER PUBLICATIONS

International Search Report issued in International Patent Application No. PCT/JP2011/004772 dated Nov. 29, 2011.
International Preliminary Report on Patentability issued in International Patent Application No. PCT/JP2011/004772 dated Mar. 19, 2013.

* cited by examiner

*Primary Examiner* — Jue Zhang
(74) *Attorney, Agent, or Firm* — McDermott Will & Emery LLP

(57) ABSTRACT

A comparator compares a voltage of a node into which electric current flows from a system of a first voltage and a reference voltage for maintaining the node at a second voltage. A step-up-type DC-DC converter receives the voltage of the node which is input to the comparator, increases the voltage to a voltage higher than the first voltage, and applies the voltage to the system of the first voltage. According to the comparison of the comparator, when the voltage of the node is higher than the reference voltage, the step-up-type DC-DC converter activates a step-up function, and when the voltage of the node is equal to or less than the reference voltage, the step-up-type DC-DC converter deactivates the step-up function.

8 Claims, 13 Drawing Sheets

FIG.3

|  | LEVEL 0 | LEVEL 1 | LEVEL 2 | LEVEL 3 | LEVEL 4 | LEVEL 5 | LEVEL 6 |
|---|---|---|---|---|---|---|---|
| SW0 |  | ○ |  |  | ○ |  | ○ |
| SW1 | ○ |  |  |  |  |  |  |
| SW2 |  |  |  |  |  |  |  |
| SW3 | ○ |  | ○ |  |  | ○ | ○ |
| SW4 |  |  |  |  |  |  |  |
| SW5 |  |  |  | ○ |  | ○ |  |
| SW6 |  | ○ |  |  |  |  |  |
| SW7 |  |  |  |  |  |  |  |
| SW8 |  |  |  |  |  |  |  |
| SW9 |  | ○ |  |  |  |  |  |
| SW10 |  |  | ○ | ○ |  |  |  |
| SW11 |  |  |  |  |  |  |  |
| APPLIED VOLTAGE | 0V | HV−MV =7V | LV =16V | MV−LV =25V | HV−LV =32V | MV =41V | HV =48V |

103c

POWER SUPPLY DEVICE AND ELECTRIC POWER CONVERSION DEVICE USING THE SAME

RELATED APPLICATIONS

This application is a Continuation of International Application No. PCT/JP2011/004772, filed on Aug. 26, 2011, which in turn claims the benefit of Japanese Application No. 2010-191200, filed on Aug. 27, 2010, the disclosures of which Applications are incorporated by reference herein.

BACKGROUND OF THE INVENTION

1. Field of the Invention

The present invention relates to a power supply device for reducing a direct current voltage, and an electric power conversion device using the same.

2. Description of the Related Art

In general, a power supply device for increasing an input voltage is equipped with a step-up-type DC-DC converter, and a power supply device for reducing an input voltage is equipped with a step-down-type DC-DC converter. In any case, a feedback circuit for regulating an output voltage of the DC-DC converter is usually provided.

By the way, when one of power supply voltages provided to both ends of a load is not connected to a ground potential, a larger number of voltages than the number of direct current voltages that can be generated by a power supply system having multiple DC-DC converters can be provided to the load. More specifically, by applying two kinds of voltages generated by the power supply system to both ends of the load, voltages other than the voltage generated by the power supply system can be applied to the load. This method is advantageous when, for example, it is applied to an inverter and the like for generating a quasi-sinusoidal wave using multiple direct current voltages.

In this method explained above, it is important to regulate a voltage applied to a lower potential-side terminal to which an electric current flows via the load from a high potential-side terminal. However, when a regulator and so on is used to regulate the voltage, electric power consumption is likely to be wasted.

SUMMARY OF THE INVENTION

A power supply device according to an aspect of the present invention includes a comparator for comparing a voltage of a node to which an electric current from a system of a first voltage flows and a reference voltage for maintaining the node at a second voltage, and a step-up-type DC-DC converter for receiving a voltage of the node which is input into the comparator, and increasing the voltage to a voltage higher than the first voltage to apply the voltage to the system of the first voltage. According to the comparison of the comparator, when the voltage of the node is higher than the reference voltage, the step-up-type DC-DC converter activates the step-up function, and when the voltage of the node is equal to or less than the reference voltage, the step-up-type DC-DC converter deactivates the step-up function.

Another aspect of the present invention is an electric power conversion device. This device includes a power supply system for generating a plurality of different direct current voltages from a direct current voltage provided by a direct current power supply, and an inverter for generating an alternating current voltage formed by quasi-sinusoidal wave, using the voltages generated by the power supply system, a zero voltage, and at least one difference voltage that can be generated from the voltages. The power supply system includes a plurality of power supply devices each including a DC-DC converter. At least one of the plurality of power supply devices of which amount of flow-in of electric current is more than the amount of flow-out of electric current is constituted by the power supply device.

BRIEF DESCRIPTION OF THE DRAWINGS

FIG. 3 is a figure illustrating a switching pattern of twelve switches SW0 to SW11 included in the parallel-type multi-level inverter as illustrated in FIG. 2;

DETAILED DESCRIPTION OF THE INVENTION

The invention will now be described by reference to the preferred embodiments. This does not intend to limit the scope of the present invention, but to exemplify the invention.

Figure 1:
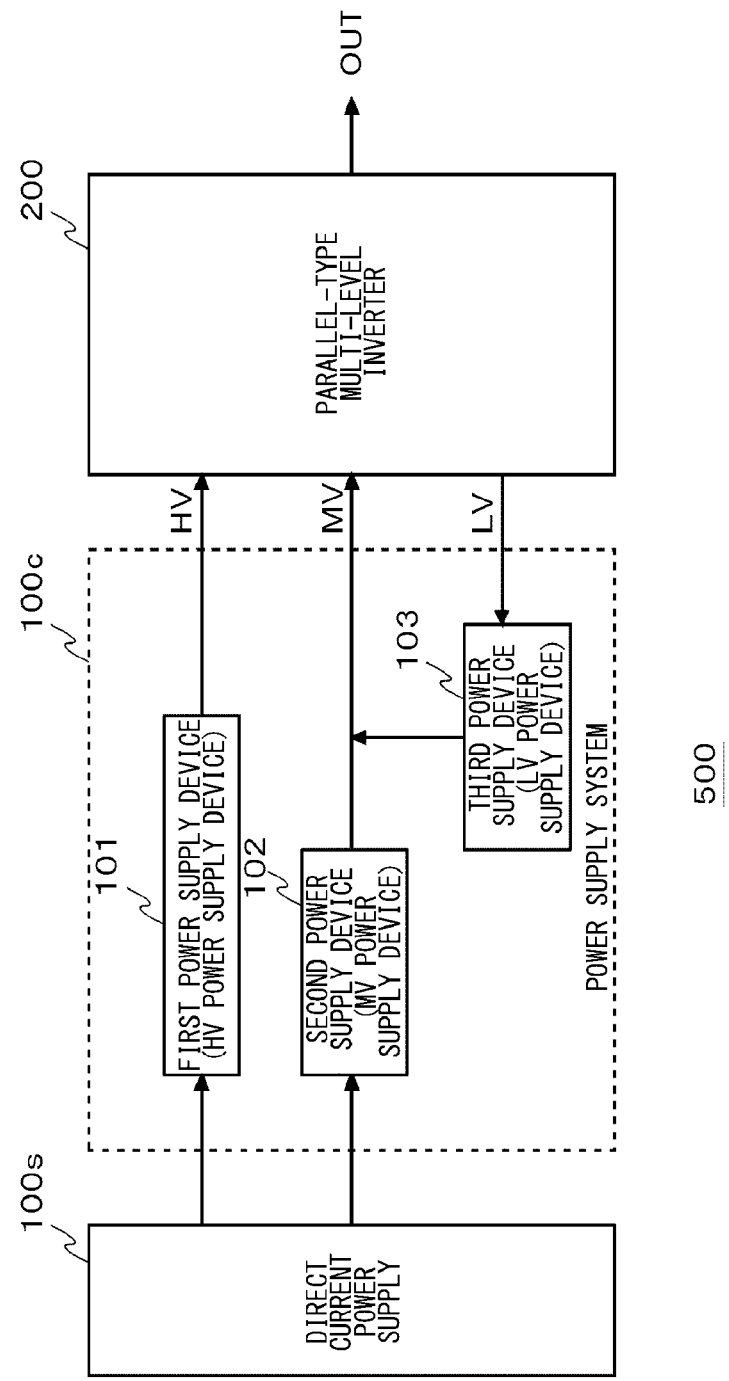
FIG. 1 is a figure illustrating a configuration of an electric power conversion system according to an embodiment of the present invention.

FIG. 1 is a figure illustrating a configuration of an electric power conversion system 500 according to an embodiment of the present invention. The electric power conversion system 500 is a system for converting a direct current electric power into an alternating current electric power, such as a solar power generation system. The electric power conversion system 500 includes a direct current power supply 100s, a power supply system 100c, and a parallel-type multi-level inverter 200.

The direct current power supply 100s has a secondary battery such as solar cell or lithium ion, nickel metal hydride, lead battery, or the like, and provides a direct current voltage to the power supply system 100c. Hereinafter, in the explanation about the present embodiment, for example, the direct current power supply 100s is considered to be solar cells, and a direct current electric power generated by the solar cells are converted into alternating current electric power by a power conditioner (which is constituted by the power supply system 100c and the parallel-type multi-level inverter 200), the alternating current electric power is output to a commercial power supply system (AC power supply system). At this occasion, a method is employed to generate multiple direct current voltage levels and to switch and use them with configured timing, thus generating a quasi-sinusoidal wave.

The power supply system 100c includes multiple power supply devices each including a DC-DC converter. In the explanation about the present embodiment, for example, the power supply system 100c includes three power supply devices, i.e., a first power supply device 101 (also referred to as an HV power supply device), a second power supply device 102 (also referred to as an MV power supply device), and a third power supply device 103 (also referred to as an LV power supply device).

The first power supply device 101, the second power supply device 102, and the third power supply device 103 generate a high voltage HV, a middle voltage MV, and a low voltage LV, respectively, and provide them to the parallel-type multi-level inverter 200. In the explanation of the present embodiment, for example, the high voltage HV, the middle voltage MV, and the low voltage LV are set as 48 V, 41 V and 16 V, respectively.

The first power supply device 101 and the second power supply device 102 are constituted by a generally-available power supply device, including a step-up-type DC-DC converter (also referred to as a step-up chopper). The configuration of the third power supply device 103 will be explained later.

The parallel-type multi-level inverter 200 at least includes an H bridge circuit receiving one of multiple direct current voltages generated by the power supply system 100c, a first bidirectional switch connected between an application terminal of another voltage of the multiple direct current voltages and the first output terminal of the H bridge circuit, and a second bidirectional switch connected between the application terminal and the second output terminal of the H bridge circuit. The parallel-type multi-level inverter 200 generates an alternating current voltage formed by quasi-sinusoidal wave, using multiple voltages generated by the power supply system 100c, a zero voltage, and at least one difference voltage that can be generated from the multiple voltages. In the present embodiment, the parallel-type multi-level inverter 200 generates an alternating current voltage formed by quasi-sinusoidal wave, using the high voltage HV, the middle voltage MV, the low voltage LV, the zero voltage, a difference voltage between the high voltage HV and the middle voltage MV, a difference voltage between the high voltage HV and the low voltage LV, and a difference voltage between the middle voltage MV and the low voltage MV. Since the voltages other than the zero voltage are either positive or negative, totally 13 types of voltages can be used.

The larger the number of usable voltages (i.e., the number of levels) are, the smoother the quasi-sinusoidal wave is formed, and therefore, the method for generating difference voltages between the voltages provided from the power supply system 100c is an effective method.

Figure 2:
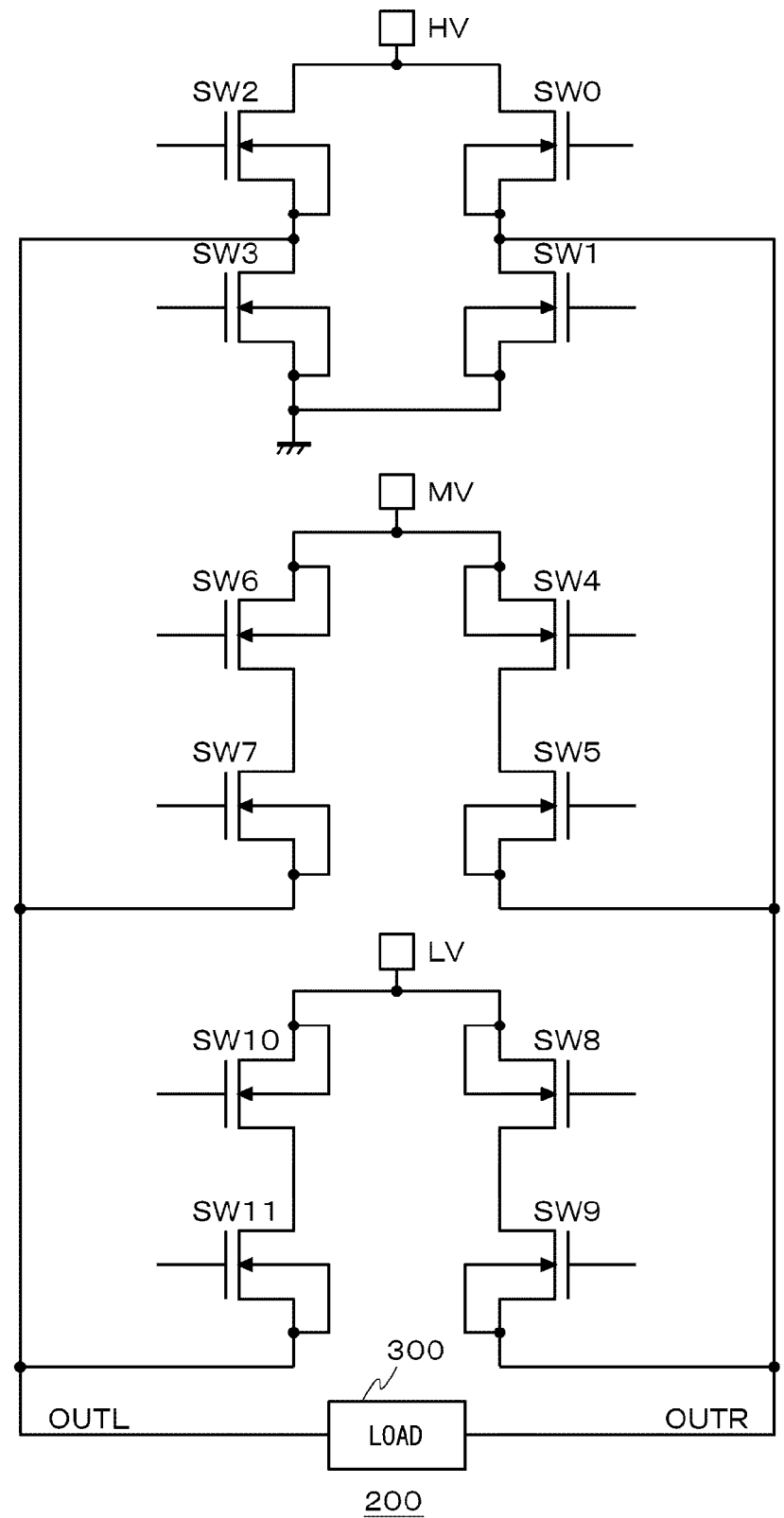
FIG. 2 is a figure illustrating an example of a configuration of a parallel-type multi-level inverter.

FIG. 2 is a figure illustrating an example of configuration of the parallel-type multi-level inverter 200. The parallel-type multi-level inverter 200 according to the present embodiment includes twelve switches (in FIG. 2, a power MOSFET is employed) SW0 to SW11, and a load 300 (for example, resistor).

A series-circuit including the 0-th switch SW0 and the first switch SW1 and a series-circuit including the second switch SW2 and the third switch SW3 are respectively connected between the high voltage HV terminal (output terminal of the first power supply device 101) and the ground terminal. An electric current path is formed, via the load 300, between a connection point of the 0-th switch SW0 and the first switch SW1 and a connection point of the second switch SW2 and the third switch SW3. More specifically, the H bridge circuit is constituted by the 0-th switch SW0, the first switch SW1, the second switch SW2, and the third switch SW3. It should be noted that each of the 0-th switch SW0, the first switch SW1, the second switch SW2, and the third switch SW3 need not be a bidirectional switch.

A series-circuit including the fourth switch SW4 and the fifth switch SW5 is connected between the middle voltage MV terminal (output terminal of the second power supply device 102) and the first output terminal of the H bridge circuit. A series-circuit including the sixth switch SW6 and the seventh switch SW7 is connected between the middle voltage MV terminal (output terminal of the second power supply device 102) and the second output terminal of the H bridge circuit. The series-circuit including the fourth switch SW4 and the fifth switch SW5 makes one bidirectional switch.

The source terminal of each of the fourth switch SW4 and the fifth switch SW5 is connected to a back gate terminal, and therefore, a parasitic diode is generated between the source and the drain of them each. The fourth switch SW4 and the fifth switch SW5 are connected in the opposite direction, and accordingly, when one of the switches is turned on, a parasitic diode is generated in the other of the switches, and an electric current flows through the parasitic diode. The same also occurs in the series-circuit of the sixth switch SW6 and the seventh switch SW7.

A series-circuit including the eighth switch SW8 and the ninth switch SW9 is connected between the low voltage LV terminal (input terminal of the third power supply device 103) and the first output terminal of the H bridge circuit. A series-circuit including the tenth switch SW10 and the eleventh switch SW11 is connected between the low voltage LV terminal (input terminal of the third power supply device 103) and the second output terminal of the H bridge circuit. The series-circuit including the eighth switch SW8 and the ninth switch SW9 makes one bidirectional switch. The tenth switch SW10 and the eleventh switch SW11 are also the same.

FIG. 3 is a figure illustrating a switching pattern of twelve switches SW0 to SW11 included in the parallel-type multi-level inverter 200 as illustrated in FIG. 2. In the 0-th level, the first switch SW1 and the third switch SW3 are turned on, and all the other switches are turned off. The ground potential is applied to both ends of the load 300, and the voltage provided to the load 300 is 0 V. In the first level, the 0-th switch SW0 and the sixth switch SW6 are turned on, and all the other switches are turned off. The high voltage HV (48V) is applied to a right-side terminal of the load 300, and the middle voltage MV (41V) is applied to a left-side terminal of the load 300, and the voltage provided to the load 300 is 7 V.

When the parallel-type multi-level inverter 200 is controlled in accordance with the switching pattern as illustrated in FIG. 3 in the same manner, 16 V, 25 V, 32 V, 41 V and 48 V are provided to the load 300 in the second level to the sixth level, respectively. FIG. 3 does not depict the seventh to the thirteenth levels, but when the switching pattern is controlled so that the direction of the electric current flowing through the load 300 becomes opposite with the switching pattern from the first to the sixth levels, −7 V, −16 V, −25 V, −32 V, −41 V and −48 V can be provided to the load 300.

Figure 4:
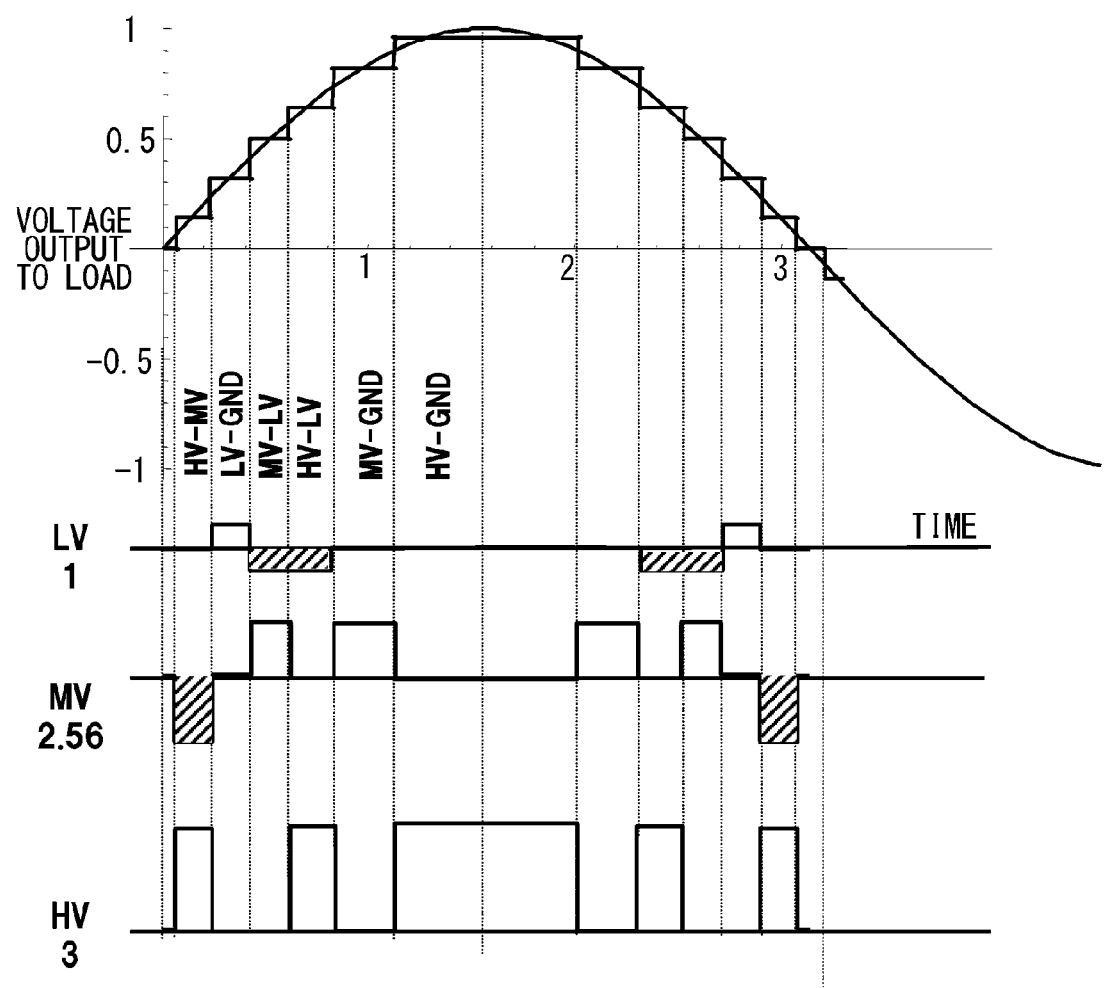
FIG. 4 is a figure illustrating a quasi-sinusoidal wave generated in the parallel-type multi-level inverter as illustrated in FIG. 2.

FIG. 4 is a figure illustrating a quasi-sinusoidal wave generated in the parallel-type multi-level inverter 200 as illustrated in FIG. 2. As described above, in the present embodiment, the following expression holds: high-voltage HV:middle voltage MV:low voltage LV=48 V:41 V:16 V=3: 2.56:1. The electric current from the system of the high voltage HV and the middle voltage MV flows into the node that is to be maintained at the low voltage LV (see shaded portions of FIG. 4). More specifically, in average, the following relationship holds: flow-in electric current>flow-out electric current. The electric current from the system of the high voltage HV also flows into the node that is to be maintained at the middle voltage MV, but the electric current flows out to the node that is to be maintained at the ground GND and the low voltage LV, and accordingly, in one-cycle average, the following relationship holds: flow-in electric current<flow-out electric current.

Figure 5:
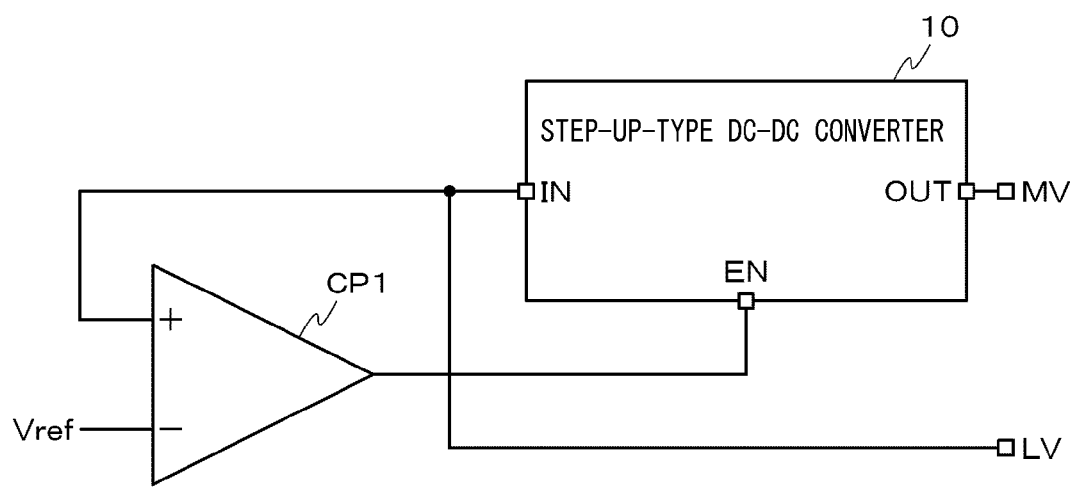
FIG. 5 is a figure illustrating a basic circuit configuration of a power supply device according to an embodiment of the present invention.

FIG. 5 is a figure illustrating a basic circuit configuration of the power supply device 103 according to the embodiment of the present invention. The power supply device 103 includes a comparator CP1 and a step-up-type DC-DC converter 10. The comparator CP1 compares a voltage of a node into which the electric current flows from the system of the first voltage and a reference voltage Vref for maintaining the node at the second voltage.

In the circuit configuration of FIG. 5, the comparator CP1 is constituted by an operational amplifier, and the voltage of the node is applied to the non-inverting input terminal thereof, and the reference voltage Vref is applied to the inverting input terminal thereof. When the voltage of the node is more than the reference voltage Vref, the high level signal is output, and when the voltage of the node is not more than the reference voltage Vref, the low level signal is output.

The step-up-type DC-DC converter 10 receives the voltage of the node which is input to the comparator CP1, increases the voltage to a voltage higher than the first voltage, and applies the voltage to the system of the first voltage. According to the comparison of the comparator CP1, when the voltage of the node is higher than the reference voltage Vref, the step-up-type DC-DC converter 10 activates the step-up function, and when the voltage of the node is equal to or less than the reference voltage Vref, the step-up-type DC-DC converter 10 deactivates the step-up function. In the circuit configuration of FIG. 5, when the high level signal is input from the comparator CP1, the step-up function of the step-up-type DC-DC converter 10 is activated, and when the low level signal is input, it is deactivated.

Like the third power supply device 103 included in the power supply system 100c as illustrated in FIG. 1, the power supply device 103 according to the present embodiment is suitable to be employed by a power supply device in which the amount of flow-in electric current is more than the amount of flow-out electric current. More specifically, the first voltage corresponds to the middle voltage MV, and the second voltage corresponds to the low voltage LV. Further, the voltage increased by the step-up-type DC-DC converter 10 is applied to the output system of the second power supply device 102, whereby electrical charge accumulated in the node that is to be maintained at the low voltage LV is returned back to the system of the middle voltage MV. For this, it is necessary for the step-up-type DC-DC converter 10 to increase the voltage to a voltage more than the middle voltage MV (in the present embodiment 41 V), and it is necessary to pass the electric current from the step-up-type DC-DC converter 10 to the output system of the second power supply device 102.

Figure 6:
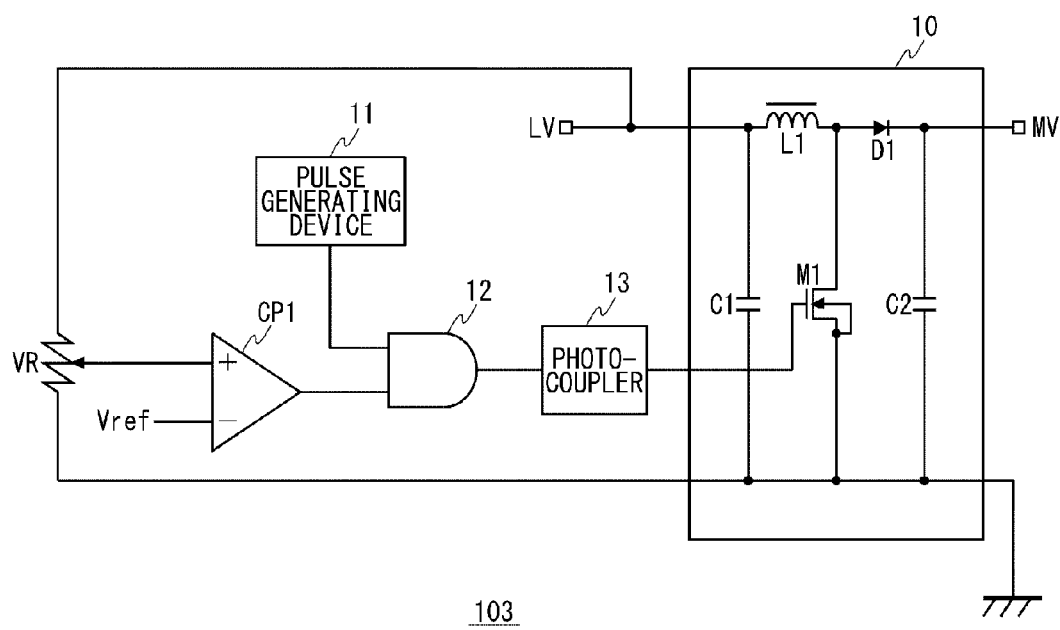
FIG. 6 is a figure illustrating a specific example of circuit configuration of the power supply device according to the embodiment of the present invention.

FIG. 6 is a figure illustrating a specific example of circuit configuration of the power supply device 103 according to the embodiment of the present invention. The power supply device 103 includes a comparator CP1, a variable resistor VR, a step-up-type DC-DC converter 10, a pulse generating device 11, an AND gate 12 and a photocoupler 13.

The reference voltage Vref applied to the inverting input terminal of the comparator CP1 is generated using a resistor divider (not illustrated) that divides the power supply voltage (for example, 5 V) of the circuit configuration as illustrated in FIG. 6. For example, it is set at 2.5 V. The low voltage LV is divided by the variable resistor VR, and is applied to the non-inverting input terminal of the comparator CP1. The variable resistor VR divides the voltage so that when the low voltage LV is an ideal value, the voltage becomes the same as the reference voltage Vref.

The pulse generating device 11 (for example, function generator) generates a pulse signal. The AND gate 12 receives the pulse signal generated by the pulse generating device 11 and a comparison result signal (used as an enable signal) which is output from the comparator CP1.

When the output signal of the comparator CP1 is at a high level, the AND gate 12 outputs the output signal of the pulse generating device 11 as it is, and when the output signal of the comparator CP1 is at a low level, the AND gate 12 outputs the low level. The output signal of the AND gate 12 is input into a switching element M1 explained later via the photocoupler 13.

As described above, when the voltage of the node (more specifically, the low voltage VL divided by the variable resistor VR) is higher than the reference voltage Vref, the AND gate 12 provides the pulse signal to the switching element M1, and when the voltage of the node is equal to or less than the reference voltage Vref, the AND gate 12 provides an OFF signal (low level) to the switching element M1.

The step-up-type DC-DC converter 10 includes an inductor L1, a diode D1, a switching element M1, a first capacitor C1, and a second capacitor C2. The series-circuit including the inductor L1 and the diode D1 is provided between an input terminal connected to the node into which the electric current flows (which is controlled to maintain the low voltage LV in the present embodiment), and an output terminal connected to the system of the first voltage from which the electric current flows out (middle voltage MV in the present embodiment).

The switching element M1 (constituted by a power MOSFET in FIG. 6) is provided between the connection point of the inductor L1 and the diode D1 and a predetermined fixed potential (ground in FIG. 6). When a pulse signal is input into the switching element M1 (the gate terminal of the power MOSFET in FIG. 6), the step-up-type DC-DC converter 10 starts step-up operation, and when the OFF signal is input, the step-up-type DC-DC converter 10 stops the step-up operation.

The first capacitor C1 is provided between the input terminal of the step-up-type DC-DC converter 10 and the fixed potential, and smoothes the voltage of the input terminal. The second capacitor C2 is provided between the output terminal of the step-up-type DC-DC converter 10 and the fixed potential, and smoothes the voltage of the output terminal.

As described above, according to the power supply device according to the present embodiment, while the input-side of the step-up-type DC-DC converter is used to regulate the voltage of the node into which the electric current flows, the step-up function is used to return the excessive electrical charge back to the source of flow-out, so that waste of electric power consumption is suppressed.

More specifically, the electrical charge flows into the node, which increases the potential of the node, and when it is more than the reference potential, the output of the comparator is inverted to a significant level (high level in the embodiment explained above). Accordingly, the step-up-type DC-DC converter is activated. More specifically, the output of the comparator serves as the enable signal for the step-up-type DC-DC converter.

When the operation of the step-up-type DC-DC converter starts, and the output voltage of the step-up-type DC-DC converter becomes more than the voltage of the source of flow-out, the electric current flows to the source of flow-out, and the potential of the node is decreased. When the potential of the node becomes less than the reference potential of the comparator, the operation of the step-up-type DC-DC converter is stopped, and the electrical charge is accumulated in the node, whereby the potential of the node is increased. Therefore, the potential of the node can be regulated. The electrical charge excessively accumulated in the node is returned back to the source of flow-out, and therefore, in principle, electric power consumption is not wasted at all.

Figure 7:
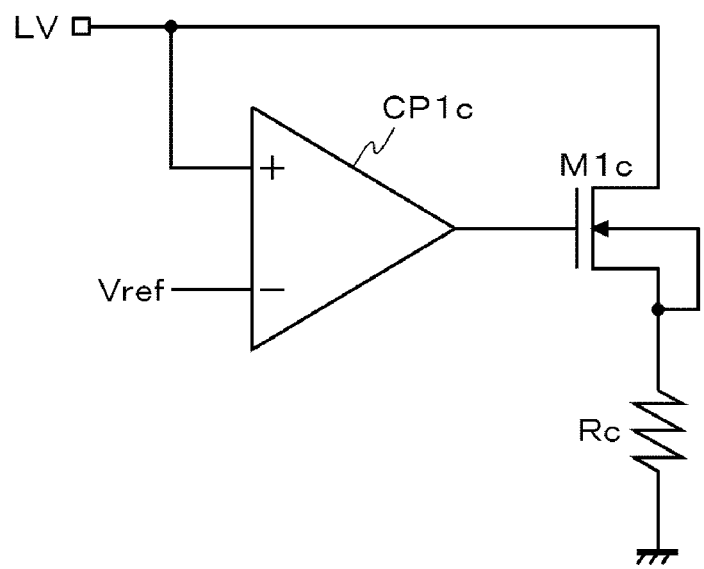
FIG. 7 is a figure illustrating a circuit configuration which is to be compared with the circuit configuration of the power supply device according to the embodiment of the present invention as illustrated in FIG. 5.

FIG. 7 is a figure illustrating a circuit configuration which is to be compared with the circuit configuration of the power supply device 103 according to the embodiment of the present invention as illustrated in FIG. 5. The power supply device 103c according to the comparative example can also regulate the potential of the node into which the electric current flows. The power supply device 103c includes a comparator CP1c, a switching element M1c, and a resistor Rc.

The voltage which is input into the comparator CP1c is the same as that of the circuit configuration as illustrated in FIG. 5. The output terminal of the comparator CP1c is connected to the control terminal of the switching element M1c (the gate terminal of the power MOSFET in FIG. 7). The input terminal of the switching element M1c (the drain terminal of the power MOSFET in FIG. 7) is connected to the node, and the output terminal thereof (the source terminal of the power MOSFET in FIG. 7) is grounded via the resistor Rc.

When excessive electrical charge flows into the node, the switching element M1c is turned on, and the electrical charge flows to the resistor Rc, where it is radiated as Joule heat. As described above, it is understood that, when the circuit configuration of FIG. 7 and the circuit configuration of FIG. 5 are compared with each other, the former consumes wasteful energy, and the latter does not lose energy in principle.

The embodiment of the present invention has been hereinabove explained. The embodiment is merely an example, and a person skilled in the art would understand that various modifications can be made in a combination of the constituent elements and processing process, and these modifications are also within the scope of the present invention.

In the above embodiment, the power supply device 103 according to the present embodiment is applied to the electric power conversion device that converts the direct current electric power provided from solar cells and a secondary battery into the alternating current electric power formed by the quasi-sinusoidal wave has been explained as an example, but the embodiment is not limited thereto. For example, the power supply device 103 according to the present embodiment may be connected between the system of the power supply voltage and the connection point of the first load and the second load connected in series between the ground and the system of the power supply voltage provided from the direct current power supply. Hereinafter, the motor system will be explained in detail using an example.

Figure 8:
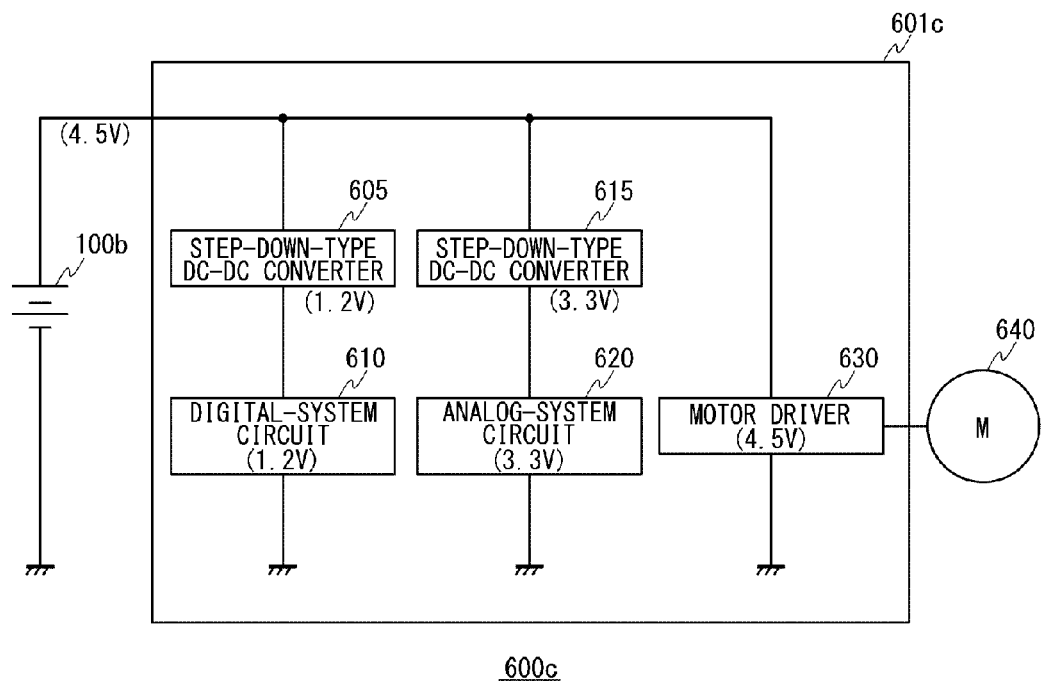
FIG. 8 is a figure illustrating a motor system not using the power supply device according to the present embodiment.

FIG. 8 is a figure illustrating a motor system 600c not using the power supply device 103 according to the present embodiment. The motor system 600c includes a direct current power supply 100b, a control circuit 601c, and motor 640. In the explanation below, for example, the direct current power supply 100b provides 4.5 V to the control circuit 601c. The control circuit 601c includes a step-down-type DC-DC converter (also referred to as step-down chopper) 605, a digital-system circuit 610, a step-down-type DC-DC converter 615, an analog-system circuit 620, and a motor driver 630.

The direct current power supply 100b provides a power supply voltage to the step-down-type DC-DC converter 605, the step-down-type DC-DC converter 615, and the motor driver 630. The step-down-type DC-DC converter 605 reduces the voltage from 4.5 V to 1.2 V, and provides it to the digital-system circuit 610 as a power supply voltage. The step-down-type DC-DC converter 615 reduces the voltage from 4.5 V to 3.3 V, and provides it to the analog-system circuit 620 as a power supply voltage. The motor driver 630 operates with the power supply voltage of 4.5 V, and drives the motor 640. The consumed electric power is in the following relationship: motor driver 630>analog-system circuit 620>digital-system circuit 610.

Figure 9:
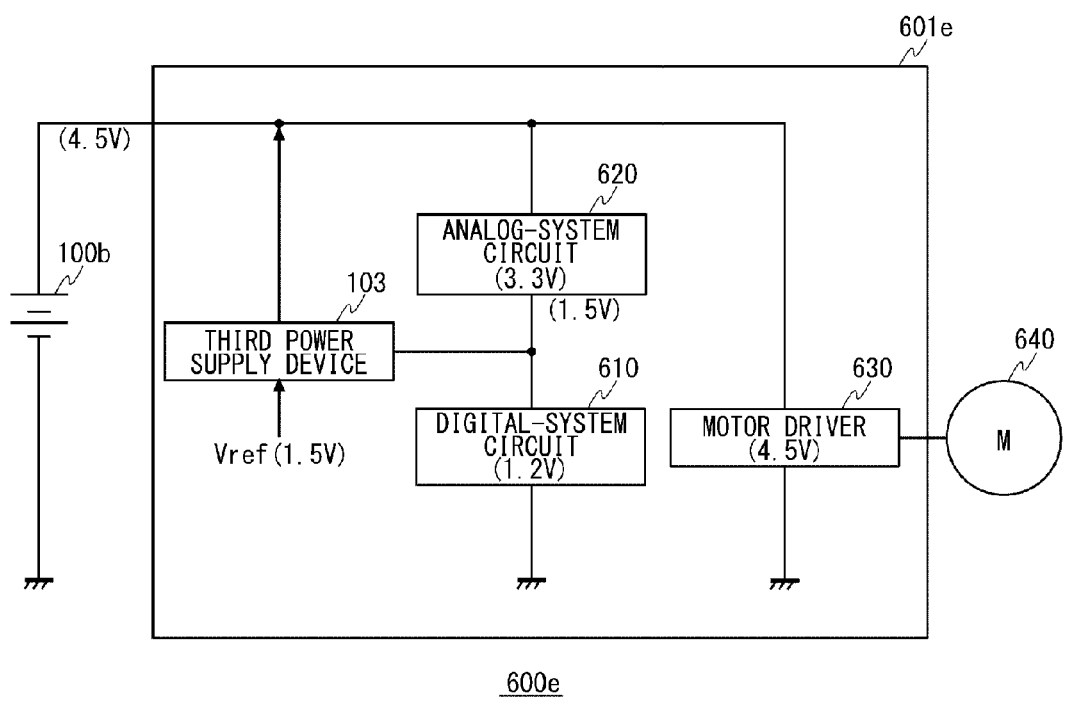
FIG. 9 is a figure illustrating a motor system using the power supply device according to the present embodiment.

FIG. 9 is a figure illustrating a motor system 600e using the power supply device 103 according to the present embodiment. The motor system 600e includes a direct current power supply 100b, a control circuit 601e, and a motor 640. The control circuit 601e includes a power supply device 103, a digital-system circuit 610, an analog-system circuit 620, and a motor driver 630. The analog-system circuit 620 and the digital-system circuit 610 are connected in series between the ground and the system of the power supply voltage.

The direct current power supply 100b provides a power supply voltage to the series-circuit including the analog-system circuit 620, the digital-system circuit 610, and the motor driver 630. The analog-system circuit 620 consumes 3.3 V, and provides 1.5 V to the digital-system circuit 610. The power supply device 103 maintains, at 1.5 V, the voltage of the connection point of the analog-system circuit 620 and the digital-system circuit 610, and at the same time, returns the electric current flowing to the analog-system circuit 620 back to the system of the power supply voltage.

When the motor system c of FIG. 8 and the motor system e of FIG. 9 are compared, the former requires two step-down-type DC-DC converters, but one step-up-type DC-DC converter included in the power supply device 103 is sufficient for the latter to work. In the latter, the electric current flowing to the analog-system circuit 620 can be returned back to the system of the power supply voltage, and therefore, the latter can reduce electric power consumption more greatly than the former.

Figure 10:
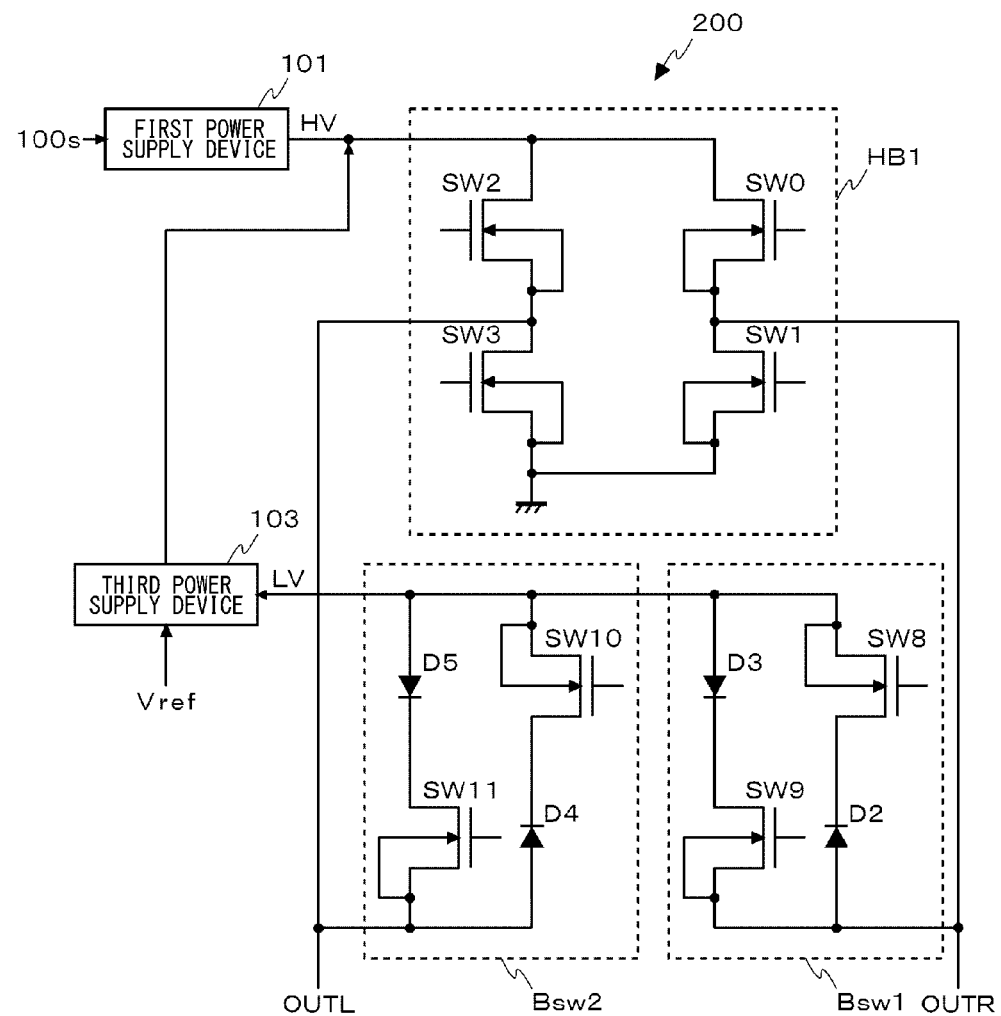
FIG. 10 is a figure illustrating an example of another configuration of a power supply system and a parallel-type multi-level inverter.

FIG. 10 is a figure illustrating an example of another configuration of a power supply system 100c and a parallel-type multi-level inverter 200. This example of configuration is simple as compared with the configuration of the power supply system 100c and the parallel-type multi-level inverter 200 as illustrated in FIGS. 1, 2. In FIG. 10, the power supply system 100c includes two power supply devices, i.e., a first power supply device 101 and a third power supply device 103. More specifically, in this configuration, the second power supply device 102 of FIG. 1 is omitted. The first power supply device 101 and the third power supply device 103 generate a high voltage HV and a low voltage LV, respectively, and provides them to the parallel-type multi-level inverter 200.

The parallel-type multi-level inverter 200 generates an alternating current voltage formed by quasi-sinusoidal wave, using the high voltage HV, the low voltage LV, the zero voltage, and a difference voltage between the high voltage HV and the low voltage LV. Since the voltages other than the zero voltage are either positive or negative, totally 7 types of voltages can be used.

When the configuration of the parallel-type multi-level inverter 200 as illustrated in FIG. 10 is compared with the configuration of the parallel-type multi-level inverter 200 of FIG. 2, the configuration of the parallel-type multi-level inverter 200 as illustrated in FIG. 10 does not have the fourth switch SW4, the fifth switch SW5, the sixth switch SW6, and the seventh switch SW7. Both of them have the configuration in which the H bridge circuit HB1 including the 0-th switch SW0, the first switch SW1, the second switch SW2, and the third switch SW3 is connected between the ground terminal and the high voltage HV terminal (output terminal of the first power supply device 101).

In FIG. 10, the bidirectional switch is depicted in a generally-available configuration. More specifically, this depicts the example of configuration of the bidirectional switch that can be applied to a transistor that does not make a parasitic diode. A first bidirectional switch Bsw1 is connected between the low voltage LV terminal (input terminal of the third power supply device 103) and the first output terminal of the H bridge circuit HB1. A second bidirectional switch Bsw2 is connected between the low voltage LV terminal (input terminal of the third power supply device 103) and the second output terminal of the H bridge circuit HB1.

The first bidirectional switch Bsw1 includes an eighth switch SW8, a ninth switch SW9, a second diode D2, and a third diode D3. A series-circuit including the eighth switch SW8 and the second diode D2 and a series-circuit including the third diode D3 and the ninth switch SW9 are connected in parallel between the input terminal of the third power supply device 103 and the first output terminal of the H bridge circuit HB1.

The source terminal of the transistor constituting the eighth switch SW8 is connected to the input terminal of the third power supply device 103, and the drain terminal of the transistor is connected to the cathode terminal of the second diode D2. The anode terminal of the second diode D2 is connected to the first output terminal of the H bridge circuit HB1. The anode terminal of the third diode D3 is connected to the input terminal of the third power supply device 103, and the cathode terminal of the third diode D3 is connected to the drain terminal of the transistor constituting the ninth switch SW9. The source terminal of the transistor is connected to the first output terminal of the H bridge circuit HB1.

The second bidirectional switch Bsw2 includes a tenth switch SW10, an eleventh switch SW11, a fourth diode D4, and a fifth diode D5. A series-circuit including the tenth switch SW10 and the fourth diode D4 and a series-circuit including the fifth diode D5 and the eleventh switch SW11 are connected in parallel between the input terminal of the third power supply device 103 and the second output terminal of the H bridge circuit HB1. The specific mode of connection of the tenth switch SW10, the eleventh switch SW11, the fourth diode D4, and the fifth diode D5 is the same as that of the eighth switch SW8, the ninth switch SW9, the second diode D2, and the third diode D3, and therefore, explanation thereabout is not repeated here.

The third power supply device 103 compares the low voltage LV and the reference voltage Vref, and performs control so as to regulate the low voltage LV. When the low voltage LV is higher than the reference voltage Vref, the electrical charge accumulated in the node that is to be maintained at the low voltage LV is returned back to the system of the high voltage HV.

In the explanation below, for example, at least one of the bidirectional switches constituting the parallel-type multi-level inverter 200 as illustrated in FIGS. 2, 10 is made with a double-gate normally-off-type GaN transistor.

Figure 11:
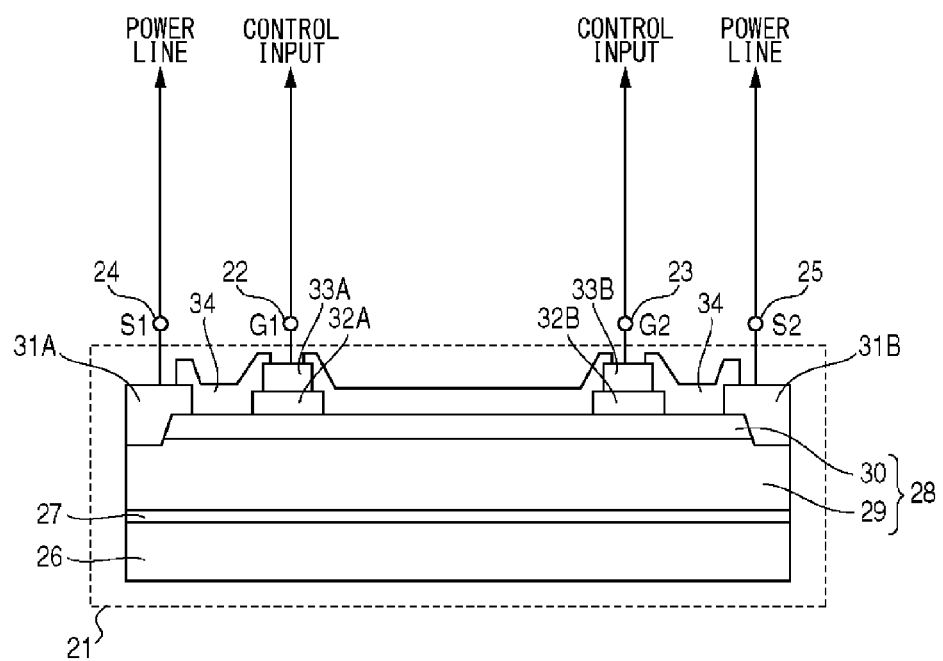
FIG. 11 is a figure for explaining a structure of a double-gate normally-off-type GaN transistor.

FIG. 11 is a figure for explaining a structure of a double-gate normally-off-type GaN transistor (hereinafter referred to as double-gate bidirectional switch 21). The double-gate bidirectional switch 21 includes a semiconductor layer stacked body 18 having a channel region, a first ohmic electrode 31A and a second ohmic electrode 31B formed on the semiconductor layer stacked body 18 with a distance therebetween, a first p-type semiconductor layer 32A and a second p-type semiconductor layer 32B formed, from the side of the first ohmic electrode 31A, between the first ohmic electrode 31A and the second ohmic electrode 31B, a first gate electrode 33A formed on the first p-type semiconductor layer 32A, and a second gate electrode 33B formed on the second p-type semiconductor layer 32B, which are arranged on a substrate 26. The drain terminal 24 is connected to the first ohmic electrode 31A. The source terminal 25 is connected to the second ohmic electrode 31B. The first gate terminal 22 is connected to the first gate electrode 33A. The second gate terminal 23 is connected to the second gate electrode 33B.

Hereinafter, this will be explained in details. The double-gate bidirectional switch 21 has, on a the substrate 26 made of silicon (Si), a buffer layer 27 having a thickness of 1 μm which is made by alternately stacking an aluminum nitride (AlN) having a thickness of 10 nm and a gallium nitride (GaN) having a thickness of 10 nm, and a semiconductor layer stacked body 28 is formed thereon.

The semiconductor layer stacked body 28 is made by successively stacking, from the side of the substrate, a first semiconductor layer and a second semiconductor layer of which band gap is higher than that of the first semiconductor layer. The first semiconductor layer is an GaN (undoped gallium nitride) layer 29 having a thickness of 2 μm, and the second semiconductor layer is an n-type AlGaN (aluminum nitride gallium) layer 30 having a thickness of 20 nm.

A portion of the GaN layer 29 close to a hetero interface with the AlGaN layer 30, electrical charge is generated by spontaneous polarization and piezoelectric polarization. Accordingly, a channel region is generated, which is a two-dimensional electron gas (2DEG) layer of which sheet carrier concentration is equal to or more than $1\times10^{13}$ cm$^{-2}$ and of which mobility is equal to or more than 1000 cm$^2$V/sec. More specifically, the semiconductor layer stacked body 28 has a channel region which is a two-dimensional electron gas (2DEG) layer, and is formed on the substrate. A first ohmic electrode 31A and a second ohmic electrode 31B are formed with a distance therebetween on the semiconductor layer stacked body 28.

In the first ohmic electrode 31A and the second ohmic electrode 31B, titan (Ti) and aluminum (Al) are stacked, respectively, and ohmic contact is formed with the channel region. In a region on the n-type AlGaN layer 30 between the first ohmic electrode 31A and the second ohmic electrode 31B, a first p-type semiconductor layer 32A and a second p-type semiconductor layer 32B are selectively formed with a distance therebetween.

On the first p-type semiconductor layer 32A, a first gate electrode 33A is formed. On the second p-type semiconductor layer 32B, a second gate electrode 33B is formed. In the first gate electrode 33A and the second gate electrode 33B, palladium (Pd) and gold (Au) are stacked, and ohmic contact is made with the first p-type semiconductor layer 32A and the second p-type semiconductor layer 32B, respectively. A protective film 34 made of silicon nitride (SiN) is formed to cover the AlGaN layer 30, the first p-type semiconductor layer 32A, and the second p-type semiconductor layer 32B.

Each of the first p-type semiconductor layer 32A and the second p-type semiconductor layer 32B has a thickness of 300 nm, and is made of p-type GaN doped with magnesium (Mg). PN junction is made by the AlGaN layer 30 and the first p-type semiconductor layer 32A and the second p-type semiconductor layer 32B. As a result, the semiconductor element for so-called normally-OFF operation is made.

The potentials are considered to be as follows. The potential of the first ohmic electrode 31A is denoted as a potential V1. The potential of the first gate electrode 33A is denoted as a potential V2. The potential of the second gate electrode 33B is denoted as a potential V3. The potential of the second ohmic electrode 31B is denoted as a potential V4. When the potential V2 is higher than the potential V1 by a predetermined voltage value (1.5 V in this case) or more, then a depletion layer extending from the first p-type semiconductor layer 32A to the channel region is reduced, and accordingly, electric current can be passed to the channel region. Hereinafter, this voltage value will be referred to as a first threshold value voltage. Likewise, when the potential V3 is higher than the potential V4 by a predetermined voltage value (1.5 V in this case) or more, then a depletion layer extending from the second p-type semiconductor layer 32B to the channel region is reduced, and accordingly, electric current can be passed to the channel region. Hereinafter, this voltage value will be referred to as a second threshold value voltage.

The distance between the first p-type semiconductor layer 32A and the second p-type semiconductor layer 32B is configured so as to withstand the maximum voltage applied to the first ohmic electrode 31A and the second ohmic electrode 31B.

Subsequently, operation of the double-gate bidirectional switch 21 will be explained. The potentials are considered to be as follows. The potential of the first ohmic electrode 31A is 0 V. The potential applied to the first gate terminal 22 is a voltage Vg1. The voltage applied to the second gate terminal 23 is a voltage Vg2.

When the potential V4 is higher than the potential V1 (for example, the potential V4 is +100 V, and the potential V1 is 0 V), the voltage Vg1 and the voltage Vg2 are set at a voltage (for example, 0 V) equal to or less than the first threshold value voltage and the second threshold value voltage. Accordingly, the depletion layer extending from the first p-type semiconductor layer 32A extends in the channel region to the second p-type GaN layer, whereby the electric current flowing to the channel can be cut off. Therefore, even when the potential V4 is a positive high voltage, cut-off state can be achieved to cut off the electric current flowing from the second ohmic electrode 31B to the first ohmic electrode 31A.

On the other hand, when the potential V4 is lower than the potential V1 (for example, potential V4 is −100 V, and the potential V1 is 0 V), the depletion layer extending from the second p-type semiconductor layer 32B extends in the channel region to the first p-type semiconductor layer 32A, and the electric current flowing to the channel can be cut off. Accordingly, even when a negative high voltage is applied to the second ohmic electrode 31B, the electric current flowing from the first ohmic electrode 31A to the second ohmic electrode 31B can be cut off. More specifically, the double-gate bidirectional switch 21 can cut off the electric current in both ways.

In the structure and operation as described above, the channel region for ensuring the break-down voltage is shared by the first gate electrode 33A and the second gate electrode 33B. This element can achieve the double-gate bidirectional switch 21 using only the size of area for the channel region of one device, and when the entire double-gate bidirectional switch 21 is considered, the size of area of the chip can be reduced as compared with a case where two diodes and two normally-off-type AlGaN/GaN-HFETs are used. Accordingly, the cost of the double-gate bidirectional switch 21 can be reduced, and the size of the double-gate bidirectional switch 21 can be reduced.

When the voltage Vg1 and the voltage Vg2 are voltages (for example, 5 V) higher than the first threshold value voltage and the second threshold value voltage, respectively, the voltages applied to the first gate electrode 33A and the second gate electrode 33B are both higher than the threshold value voltages. Therefore, since the depletion layer does not extend from the first p-type semiconductor layer 32A and the second p-type semiconductor layer 32B to the channel region, the channel region is not pinched off even at the lower side of the first gate electrode 33A and the lower side of the second gate electrode 33B. As a result, conductive state can be achieved, in which electric current flows in both ways between the first ohmic electrode 31A and the second ohmic electrode 31B.

Figure 12A:
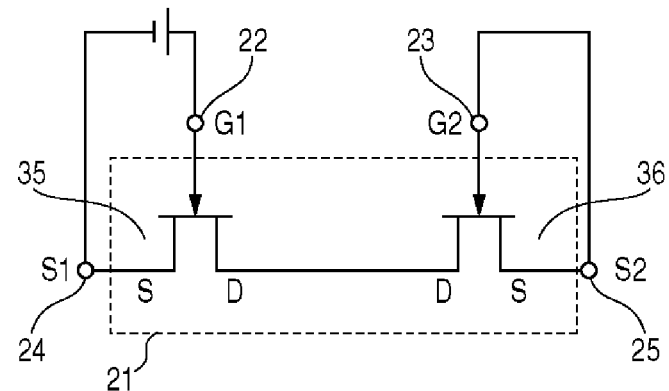
FIGS. 12A to 12C are figures for explaining an equivalent circuit in various kinds of states of a double-gate bidirectional switch.
Figure 12B:
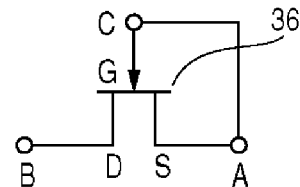
Figure 12C:
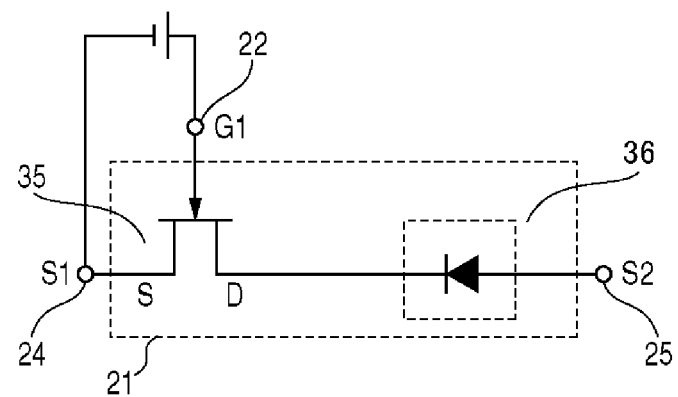

Subsequently, operation will be explained, where the voltage Vg1 is a voltage higher than the first threshold value voltage, and the voltage Vg2 is equal to or less than the second threshold value voltage. FIGS. 12A to 12C are figures for explaining an equivalent circuit in various kinds of states of the double-gate bidirectional switch 21.

FIG. 12A is a figure illustrating an equivalent circuit which is a basic form of the double-gate bidirectional switch 21 having the first gate terminal 22 and second gate terminal 23. The equivalent circuit may be deemed as a circuit in which a first transistor 35 and a second transistor 36 are connected in series. In this case, a source (S) of the first transistor 35 corresponds to the first ohmic electrode 31A, a gate (G) of the first transistor 35 corresponds to the first gate electrode 33A, a source (S) of the second transistor 36 corresponds to the second ohmic electrode 31B, and a gate (G) of the second transistor 36 corresponds to the second gate electrode 33B.

In the equivalent circuit as illustrated in FIG. 12A, the gate and the source of the second transistor 36 is shorted (i.e., voltage Vg2 is 0 V). FIG. 12B is a circuit diagram illustrating the second transistor 36 when the gate and the source are shorted. In the explanation below, a terminal at an outer side is a terminal A, a terminal at the side of the first transistor 35 is a terminal B, and a gate terminal is a terminal C.

When the potential of the terminal B as illustrated in FIG. 12B is higher than the potential of the terminal A, it may be deemed as a transistor of which terminal A is the source and the terminal B is the drain. In such case, the voltage between the terminal C (gate) and the terminal A (source) is 0 V, and is equal to or less than the second threshold value voltage, and therefore, no electric current flows from the terminal B (drain) to the terminal A (source).

On the other hand, when the potential of the terminal A is higher than the potential of the terminal B, it may be deemed as a transistor of which terminal B is the source and the terminal A is the drain. In such case, the potentials of the terminal C (gate) and the terminal A (drain) are the same. Therefore, when the potential of the terminal A is equal to or less than the second threshold value voltage with respect to the potential of the terminal B, no electric current flows from the terminal A (drain) to the terminal B (source). When the potential of the terminal A is more than the second threshold value voltage with respect to the potential of the terminal B, a voltage equal to or more than the second threshold value voltage is applied to the terminal C (gate), and electric current can be passed from the terminal A (drain) to the terminal B (source).

When the gate and the source of the transistor are shorted, it functions as a diode in which the drain is the cathode and the source is the anode, and the forward rising voltage thereof is the threshold value voltage of the transistor. For this reason, the portion of the second transistor 36 as illustrated in FIG. 12A may be deemed as a diode.

FIG. 12C is a figure illustrating an equivalent circuit of the double-gate bidirectional switch 21 when the second transistor 36 functions as a diode. In the equivalent circuit as illustrated in FIG. 12C, when the potential of the terminal S2 of the double-gate bidirectional switch 21 is higher than the potential of the terminal S1, and a voltage more than the first threshold value voltage is applied to the first gate terminal 22 of the first transistor 35, the first transistor 35 is in ON state, and electric current can be passed from the terminal S2 to the terminal S1. However, an ON voltage occurs due to the forward rising voltage of the diode.

When the potential of the terminal S1 of the double-gate bidirectional switch 21 is higher than the potential of the terminal S2, the voltage is held by the diode formed by the second transistor 36, and the electric current flowing from the terminal S1 to the terminal S2 of the double-gate bidirectional switch 21 is blocked. More specifically, when the voltage more than the first threshold value voltage is applied to the first gate terminal 22, and the voltage equal to or less than the second threshold value voltage is applied to the second gate terminal 23, the switch can be achieved that enables the state in which the so-called bidirectional element is turned ON and operation with the cathode-side of the diode being connected to the drain-side in series.

As described above, in accordance with the gate bias condition, the double-gate bidirectional switch 21 has a function of cutting off and allowing conduction of the electric current in both ways, and is also capable of diode operation, wherein the direction in which the electric current of the diode passes can also be switched. As described above, four operation modes can be achieved in accordance with the ON or OFF condition of the first gate terminal 22 and the second gate terminal 23 of the double-gate bidirectional switch 21.

Figure 13:
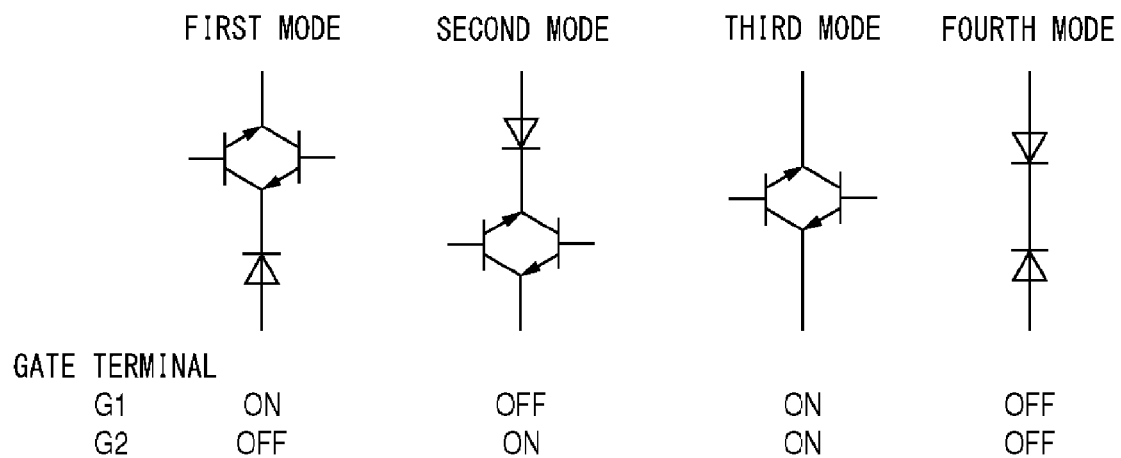
FIG. 13 is a figure for explaining four operation modes of the double-gate bidirectional switch.

FIG. 13 is a figure for explaining four operation modes of the double-gate bidirectional switch 21. In the first mode, the first gate terminal 22 is turned on, and the second gate terminal 23 is turned off. In this case, the double-gate bidirectional switch 21 acts as a semiconductor element in which a bidirectional device in ON state and a backward diode are connected from the terminal S1 to the terminal S2 in series.

In a second mode, the first gate terminal 22 is turned OFF, and the second gate terminal 23 is turned ON. In this case, the double-gate bidirectional switch 21 acts as a semiconductor element in which a forward diode and a bidirectional device in the ON state are connected from the terminal S1 to the terminal S2 in series.

In a third mode, the first gate terminal 22 and the second gate terminal 23 are both turned ON. In this case, the double-gate bidirectional switch 21 acts as a semiconductor switch element in conductive state in both ways.

In a fourth mode, the first gate terminal 22 and the second gate terminal 23 are both turned OFF. In this case, the double-gate bidirectional switch 21 acts as a semiconductor element in which two diodes are connected in series in the opposite direction. Accordingly, this semiconductor element cuts off electric current in both forward and backward directions.

In the third mode, electric current can be passed in both ways without rising voltage between the terminal S1 and the terminal S2. In the first mode and the second mode, only one of the first gate terminal 22 and the second gate terminal 23 is turned ON, so that rectification effect for passing the electric current only in one direction can be provided. Therefore, the double-gate bidirectional switch 21 can achieve a single-chip bidirectional switch with extremely low electric power loss during switching.

This structure is similar to JFET, but operates according to operation principle of intentionally injecting carrier which is completely different from the JFET which performs carrier modulation in the channel region with gate electric field. More specifically, when the gate voltage is 3 V or less, this structure operates as the JFET, but when a gate voltage of 3 V or higher which is beyond the built-in potential of the pn junction is applied, holes are injected into the gate, and due to the mechanism as described above, the electric current increases, thus allowing operation with a high electric current and a low ON resistance.

The bidirectional switch 21 is such that the first gate electrode 33A is formed on the first p-type semiconductor layer 32A having p-type conductivity and the second gate electrode 33B is formed on the second p-type semiconductor layer 32B having p-type conductivity. For this reason, when forward bias is applied from the first gate electrode 33A and the second gate electrode 33B to the channel region generated at the interface region of the first semiconductor layer and the second semiconductor layer, holes can be injected into the channel region. In a nitride semiconductor, the mobility of holes is greatly less than the mobility of electrons, and therefore, the holes injected into the channel region hardly contributes as a carrier for passing electric current. Therefore, the holes injected from the first gate electrode 33A and the second gate electrode 33B generate the same amount of electrons in the channel region, so that the effect of generating electrons in the channel region is enhanced, and the holes function like donor ions. More specifically, carrier concentration modulation can be done in the channel region, and accordingly, the normally-off-type nitride semiconductor layer bidirectional switch can be achieved with a high operation electric current.

The double-gate bidirectional switch 21 explained above is applied to the bidirectional switch constituting the parallel-type multi-level inverter 200 according to the present embodiment, and the first mode, second mode and fourth mode as illustrated in FIG. 13 are used. When the double-gate bidirectional switch 21 is applied to the bidirectional switch constituting the parallel-type multi-level inverter 200, the bidirectional switch that was made with multiple elements can be made with a single element, and the size of the bidirectional switch can be reduced, and the cost of the bidirectional switch can be reduced. During switching of the bidirectional switch, the electric power loss can be suppressed, and the electric power consumption of the entire parallel-type multi-level inverter 200 can be reduced.

What is claimed is:

1. An electric power conversion device comprising:
a power supply system for generating a plurality of different direct current voltages from a direct current voltage provided by a direct current power supply; and
an inverter for generating an alternating current voltage formed by quasi-sinusoidal wave, using the voltages generated by the power supply system, a zero voltage, and at least one difference voltage that can be generated from the voltages, wherein
the power supply system includes a plurality of power supply devices each including a DC-DC converter, and
at least one of the plurality of power supply devices of which amount of flow-in of electric current is more than the amount of flow-out of electric current, comprises:

a comparator for comparing a voltage of a node to which an electric current from a system of a first voltage flows and a reference voltage for maintaining the node at a second voltage; and a step-up-type DC-DC converter for receiving a voltage of the node which is input into the comparator, and increasing the voltage to a voltage higher than the first voltage to apply the voltage to the system of the first voltage, wherein the step-up-type DC-DC converter activates a step-up function when, as a result of comparison made by the comparator, the voltage of the node is higher than the reference voltage, and the step-up-type DC-DC converter deactivates the step-up function when the voltage of the node is equal to or less than the reference voltage.

2. The electric power conversion device according to claim 1, wherein the at least one of the plurality of power supply devices further comprises:

a pulse signal generator for generating a pulse signal; and
a logic gate for receiving the pulse signal generated by the pulse signal generator and a comparison result signal which is output from the comparator, wherein
the step-up-type DC-DC converter includes:
a series-circuit including an inductor and a diode provided between an input terminal into which the voltage of the node is input and an output terminal connected to the system of the first voltage; and
a switching element provided between a predetermined fixed potential and a connection point of the inductor and the diode, and wherein
when the voltage of the node is higher than the reference voltage, the logic gate provides the pulse signal to the switching element, and when the voltage of the node is equal to or less than the reference voltage, the logic gate provides an OFF signal to the switching element.

3. The electric power conversion device according to claim 1, wherein the at least one of the plurality of power supply devices is connected between the system of the first voltage and a connection point of a first load and a second load, the first load and the second load being connected in series between a ground and the system of the first voltage provided from a direct current power supply.

4. The electric power conversion device according to claim 1, wherein
the inverter includes:
an H bridge circuit for receiving one of the plurality of direct current voltages;
a first bidirectional switch connected between a first output terminal of the H bridge circuit and an application terminal of another voltage of the plurality of direct current voltages; and
a second bidirectional switch connected between the application terminal and a second output terminal of the H bridge circuit, and wherein
at least one of the first bidirectional switch and the second bidirectional switch is constituted by a double-gate normally-off-type GaN transistor.

5. The electric power conversion device according to claim 1, wherein
the power supply system includes a first power supply device for generating a high voltage, a second power supply device for generating a middle voltage, and a third power supply device for generating a low voltage, the inverter generates an alternating current voltage formed by the quasi-sinusoidal wave, using the high voltage, the middle voltage, the low voltage, a zero voltage, a difference voltage between the high voltage and the middle voltage, a difference voltage between the high voltage and the low voltage, and a difference voltage between the middle voltage and the low voltage, the third power supply device is the at least one of the plurality of power supply devices, and the voltage boosted by the step-up-type DC-DC converter included in the third power supply device is applied to an output system of the first power supply device or the second power supply device.

6. The electric power conversion device according to claim 5, wherein
the inverter includes:
an H bridge circuit connected to an output terminal of the first power supply device;
a first bidirectional switch connected between an output terminal of the second power supply device and a first output terminal of the H bridge circuit;
a second bidirectional switch connected between the output terminal of the second power supply device and a second output terminal of the H bridge circuit;
a third bidirectional switch connected between an input terminal of the third power supply device and a first output terminal of the H bridge circuit; and
a fourth bidirectional switch connected between the input terminal of the third power supply device and a second output terminal of the H bridge circuit, and wherein
at least one of the first bidirectional switch, the second bidirectional switch, the third bidirectional switch, and the fourth bidirectional switch is constituted by a double-gate normally-off-type GaN transistor.

7. The electric power conversion device according to claim 1, wherein
the power supply system includes a first power supply device for generating a high voltage and a second power supply device for generating a low voltage,
the inverter generates an alternating current voltage formed by the quasi-sinusoidal wave, using the high voltage, the low voltage, a zero voltage, and a difference voltage between the high voltage and the low voltage,
the second power supply device is the at least one of the plurality of power supply devices, and
the voltage boosted by the step-up-type DC-DC converter included in the second power supply device is applied to an output system of the first power supply device.

8. The electric power conversion device according to claim 7, wherein
the inverter includes:
an H bridge circuit connected to an output terminal of the first power supply device;
a first bidirectional switch connected between an input terminal of the third power supply device and a first output terminal of the H bridge circuit; and
a second bidirectional switch connected between the input terminal of the third power supply device and a second output terminal of the H bridge circuit, and wherein
at least one of the first bidirectional switch and the second bidirectional switch is constituted by a double-gate normally-off-type GaN transistor.

* * * * *